Aug. 2, 1960

F. E. HOBSON 2,947,670

FRACTIONAL DISTILLATION OF VOLATILES FROM SOLIDS

Filed July 9, 1954

INVENTOR.
Frank E. Hobson
BY
Grush Wells
Atty.

United States Patent Office 2,947,670
Patented Aug. 2, 1960

2,947,670

FRACTIONAL DISTILLATION OF VOLATILES FROM SOLIDS

Frank E. Hobson, Missoula, Mont., assignor to P.D. & P. Processing Inc., Lewiston, Idaho, a corporation of Idaho Filed July 9, 1954, Ser. No. 442,379

3 Claims. (Cl. 202—22)

My invention relates to fractional distillation of volatiles from solids.

It is well known that in removing the volatile substances found in aggregates of particles of solids such as coal, ore, wood particles and the like, the various volatile substances boil and separate from the non-volatile material over a wide temperature range. It is the purpose of my invention to provide a method and apparatus for fractional distillation of such substances in such manner as to discharge the volatilized substances at predetermined temperatures that may be selected closely to approximate the volatilization temperature thereof whereby to effect adequate removal of the volatiles with minimum heat requirements and minimum retardation of volatilization due to gas pressure in the heating area.

More specifically it is the object of this invention to extract the volatile constituents of aggregates of solids such as those mentioned, by confining the aggregates in a slowly moving stream which fills the space between two confining surfaces, one of which is moving relatively to the other and relatively to the stream, increasing the temperature of the aggregates as they move down, and separately removing from the stream the volatile materials of different temperature ranges as volatilized, before their temperatures are materially raised in the volatile state.

The nature and advantages of my invention will be made clear from the following detailed description and the accompanying drawings which drawings illustrate diagrammatically the essential apparatus employed in my invention. It should be understood, however, that the description and drawings are illustrative only and are not intended to limit the scope of the invention except insofar as it is limited by the claims hereinafter set forth.

Figure 1:
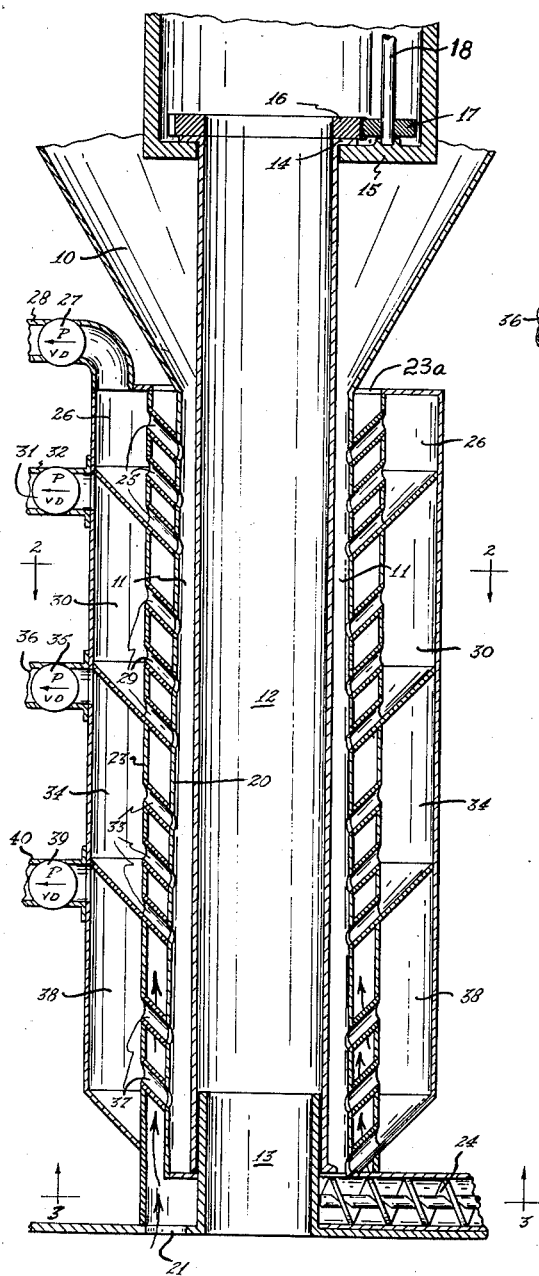
Figure 1 is a diagrammatic view of an apparatus employed in my invention.
Figure 2:
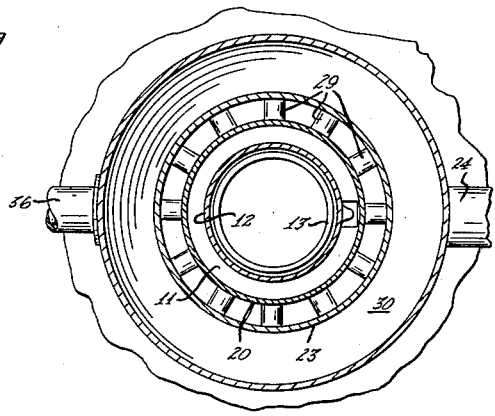
Figure 2 is a cross sectional view at 2—2 of Figure 1.
Figure 3:
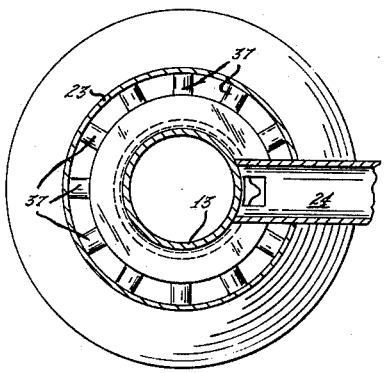
Figure 3 is a cross sectional view of the device taken on the line 3—3 of Figure 1.

In the diagrammatic showing of the drawings, the numeral 10 indicates a hopper from which the aggregate which is to be heated, is delivered into an annular space 11 at a rate to keep this space filled with material. The inner wall of the annular space 11 comprises a tube 12 which fits over an inlet sleeve 13 at its lower end so that hot gases may flow upwardly in the tube 12. The tube 12 is suspended by a bearing flange 14 upon a supporting member 15 so that the tube may be rotated. The means of rotation is shown as a suitable gear 16 above the ring 14 and a drive pinion 17 which is driven by a shaft 18 from a power device such as an electric motor. The aggregate is confined in the space 11 by an outer tube 20 which is stationary as shown. An inlet 21 is provided to admit hot gases around the outer tube 20 and a third tube 23 is provided outside the tube 20 to form a channel for the hot gases. The upper end of the annular space between the members 20 and 23 is open as shown at 23a in Figure 1 to provide for egress of the hot gases. The hot gases used to heat the device may be generated in any suitable manner. I have found an oil furnace quite sufficient for the purpose. Flues (not shown) extending from the source of the hot gases to the sleeve 13 and opening 21 are provided to conduct the gases to the retort. The amount of heat required, of course, depends upon the nature of the aggregate introduced into the retort. Any suitable means such as the conveyor 24 may be provided at the bottom of the channel 11 to remove the aggregate from the channel 11 at the desired rate.

It will be appreciated that as the aggregate moves down in the channel 11, it will be gradually heated so that, that portion of the aggregate in the uppermost part of the space 11 will first be caused to lose the volatile material which boils at a very low temperature. The body of aggregate above the channel 11 acts to hold the volatilized material against ready escape upwardly so that this volatile material may be extracted outwardly. The upper portion of the tube 20 is shown as provided with a multiplicity of outlets 25 in the form of small tubes or pipes that empty into a collecting chamber 26. The collecting chamber 26 has a suction device 27 connected thereto to draw off the gases and maintain a sub-atmospheric pressure in the collecting chamber. The gases are discharged into a conduit 28 from which they may go to a condenser or other known collector. At a lower level the tube 20 is provided with another series of outlet tubes 29 which open into a collecting chamber 30 from which the gases are drawn off by a suction device 31 to a conduit 32. Still farther along the channel 11, outlets 33 in the tube 20 discharge into a collecting chamber 34 which is connected by a suction device 35 to a tube 36 and near the bottom portion of the channel 11 outlet tubes 37 connected to the tube 20, lead to a collecting chamber 38 from which the gases are drawn out through a suction device 39 and discharged through a conduit 40.

It is a fundamental principle of physics that to raise the temperature of matter of any nature, heat is required. Therefore to raise the temperature of vapor or gas of a volatile substance above its point of boiling or ebullition requires additional heat. If in heating the aggregate material, the volatilizing substances are required to remain in the heated mass until the temperature required to volatilize all the volatile substances, considerable heat is wasted in heating the gasses of the low boiling point substances to the final temperature. For example, consider that an aggregate to be heated contains substances having a boiling point of 1000 degrees F. Assume also that the aggregate contains an appreciable amount of water, the boiling point of which is 212 degrees F. If the aggregate is heated in such a manner that the volatilized substances must remain entrapped with the aggregate until the final temperature is reached, the water vapor generated at 212 degrees F. would be heated to the final temperature of 1000 degrees F. and would consume unnecessary heat in the amount necessary to raise the vapor 800 degrees F. With my method, the water vapor, being generated near the top of the channel 11, will be immediately drawn off to the chamber 26 and through the suction device 27. In this way it is removed from the presence of the aggregate, and from the heat immediately upon volatilizing and does not consume additional heat. Thus, my method effects a considerable saving of heat while operating efficiently to distill the volatile substances from the solids. It will be appreciated, of course, that the conduits 28, 32, 36, and 40 may be either discharged into a common outlet or to separate scrubbers and condensers where it is desired to treat the volatile substances separately.

The apparatus is particularly advantageous in the low temperature heat treatment of such material as coal, finely divided wood, oil, shale or sand. These materials are in particle form when ready for treatment and will flow as a continuous unobstructed stream down through the space 11 freely without clogging so long as the tube 12 is rotated or moved in such a manner as to keep the mass of particles from solidifying. The provision of the concentric tubes 12, 20 and 23 lends itself readily to the heating of the granular material in an efficient manner because the heat is being applied counter current wise and from both faces of the channel 11. The moving stream of the aggregate which is being distilled or calcined is between two surfaces that confine the stream. One of the surfaces moves with respect to the other surface and the other surface provides the necessary outlets for trapping off the volatile material as it boils out of the aggregate. In this way there is no waste of heat in unnecessarily increasing the temperature of the volatile material which has already boiled out.

While I do not wish to confine myself exclusively to the particular apparatus shown and described, or the manner of assembling the same, I do consider as my invention the method and apparatus by which the material from which the volatile component is to be distilled, is moved gradually through a channel as its temperature is increased and the various volatile components are extracted from the material at a plurality of temperature ranges which avoid wasting heat and unnecessary raising of the temperature of the volatile components that separate at relatively low temperatures. The foregoing method not only avoids the excessive heating of the ore extracted volatile components, but prevents the possibility of further reaction of low temperature volatiles and high temperature volatiles within the distillation channel after they have once been boiled out of the aggregate.

It is believed that the nature and advantages of my invention will be apparent from the foregoing description.

Having thus described my invention, I claim:

1. A method of extracting the volatile constituents of aggregates of solid particles which comprises flowing the solid particles downward by gravity in a continuous stream between an inner confining wall and an outer confining wall, keeping said particles in engagement with other particles in said stream and maintaining engagement between the walls and particles, flowing continuous streams of hot gaseous fluid upwardly in contact with and covering said confining walls thereby supplying heat through said walls to the solid particles and gradually increasing the temperature of said particles as they move down between the walls, and withdrawing the volatilized constituents from the stream of particles through one of the walls and through the gaseous fluid stream covering it.

2. A method of extracting the volatile constituents of aggregates of solid particles which comprises flowing the solid particles downwardly by gravity in a continuous stream between an inner confining wall and an outer confining wall and in intimate contact therewith, keeping one of said walls moving in a direction transversely of the stream, supplying heat through both of said walls, gradually to increase the temperature of the particles as they move down between the walls whereby to volatilize the volatile constituents of said particles having the lowest boiling temperatures near the top of the stream and to volatilize these constituents having higher volatilizing temperatures at lower levels in the stream, and withdrawing the volatilized constituents from the stream through the wall that is not moving transversely of the stream at different levels along the height of the stream.

3. A method of extracting the volatile constituents of aggregates of solid particles which comprises flowing the solid particles in vertical paths downwardly by gravity in a vertically continuous unobstructed stream surrounding and engaging an inner confining wall and within and engaging an outer confining wall, keeping one of said walls moving with respect to the other wall in a direction to maintain the stream's cross section unchanged, supplying heat through both of said walls gradually to increase the temperature of the particles as they move down between the walls whereby to volatilize the volatile constituents of said particles having the lowest boiling temperatures near the top of the stream and to volatilize those constituents of said particles having higher volatilizing temperatures at lower levels in the stream, and withdrawing the volatilized constituents outwardly from the stream as they are volatilized before their temperatures are materially raised in the volatile state.

References Cited in the file of this patent

UNITED STATES PATENTS

| | | |
|---|---|---|
| 1,196,470 | Del Monte y Aldama | Aug. 29, 1916 |
| 1,423,527 | McD. Johns | July 25, 1922 |
| 1,552,471 | Davidson et al. | Sept. 8, 1925 |
| 1,669,023 | Runge | May 8, 1928 |
| 1,723,932 | Greene et al. | Aug. 6, 1929 |
| 1,766,132 | Kraul | June 24, 1930 |
| 1,783,190 | Hertel | Dec. 2, 1930 |
| 1,953,040 | Brandegee | Mar. 27, 1934 |
| 1,983,801 | Hillstrom | Dec. 11, 1934 |
| 2,167,503 | Gilles | July 25, 1939 |
| 2,600,425 | Parry | June 17, 1952 |

FOREIGN PATENTS

| | | |
|---|---|---|
| 480,286 | France | July 12, 1916 |